(12) United States Patent
Hansson et al.

(10) Patent No.: US 7,433,305 B2
(45) Date of Patent: Oct. 7, 2008

(54) METHOD AND ARRANGEMENT IN A PACKET SWITCH

(75) Inventors: Ulf Peter Hansson, Huddinge (SE); Lars-Göran Petersen, Tumba (SE); Mats Nils Fredrik Ernkell, Stockholm (SE)

(73) Assignee: Telefonaktiebolaget L M Ericsson (PUBL), Stockholm (SE)

(*) Notice: Subject to any disclaimer, the term of this patent is extended or adjusted under 35 U.S.C. 154(b) by 924 days.

(21) Appl. No.: 10/691,285

(22) Filed: Oct. 21, 2003

(65) Prior Publication Data

US 2004/0109412 A1 Jun. 10, 2004

Related U.S. Application Data

(60) Provisional application No. 60/420,087, filed on Oct. 21, 2002.

(51) Int. Cl.
*H04L 12/26* (2006.01)
(52) U.S. Cl. ..................................... 370/229
(58) Field of Classification Search .............. 370/235, 370/235.1
See application file for complete search history.

(56) References Cited

U.S. PATENT DOCUMENTS

| | | | | |
|---|---|---|---|---|
| 6,674,721 | B1 * | 1/2004 | Dittia et al. ................. | 370/235 |
| 6,687,247 | B1 * | 2/2004 | Wilford et al. ............... | 370/392 |
| 7,012,889 | B1 * | 3/2006 | Turner et al. ................. | 370/229 |
| 7,180,857 | B2 * | 2/2007 | Kawakami et al. ........... | 370/231 |
| 2003/0126280 | A1 * | 7/2003 | Yao et al. ...................... | 709/234 |
| 2006/0285551 | A1 * | 12/2006 | Barker et al. ................. | 370/465 |
| 2006/0292292 | A1 * | 12/2006 | Brightman et al. ............ | 427/66 |

OTHER PUBLICATIONS

Tamir et al, High-Performance Multi-Queue Buffers for VLSI Communication Switches, IEEE, pp. 343-354, 1998.*

* cited by examiner

*Primary Examiner*—Frank Duong

(57) ABSTRACT

A system and method are disclosed for switching a data flow of information packets intended for paths between a respective sending and receiving entity, the method includes buffering the packets from the paths in a queue; halting a sending entity on congestion of the queue; storing the halt condition in a switch state; noting the individual portions that different of the paths occupy in the queue; halting the sending entity for the path occupying the individually greatest portion of the queue; storing the halted path in a free one of the switch states including storing its bandwidth; successively updating the respective bandwidth of halted paths as the queue is repeatedly congested; determining an older part of the states; and purging the state for a path having the smallest bandwidth in said older part of the states.

8 Claims, 7 Drawing Sheets

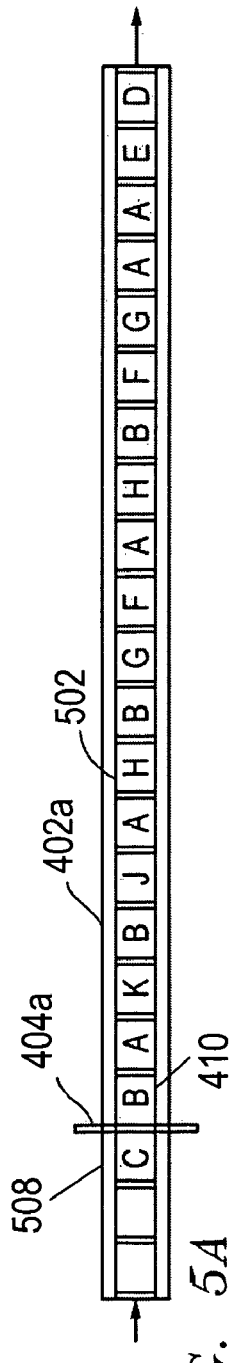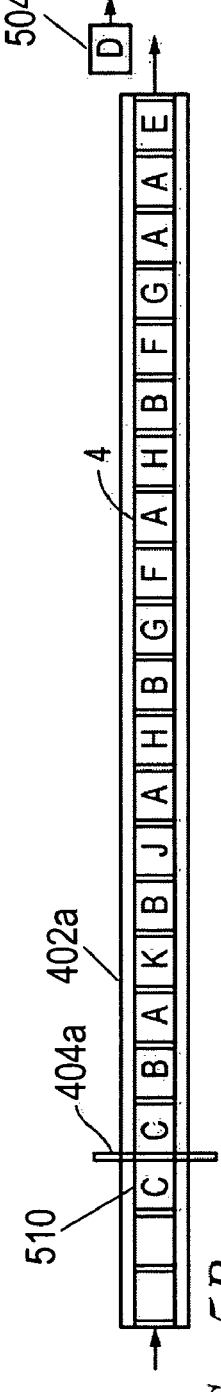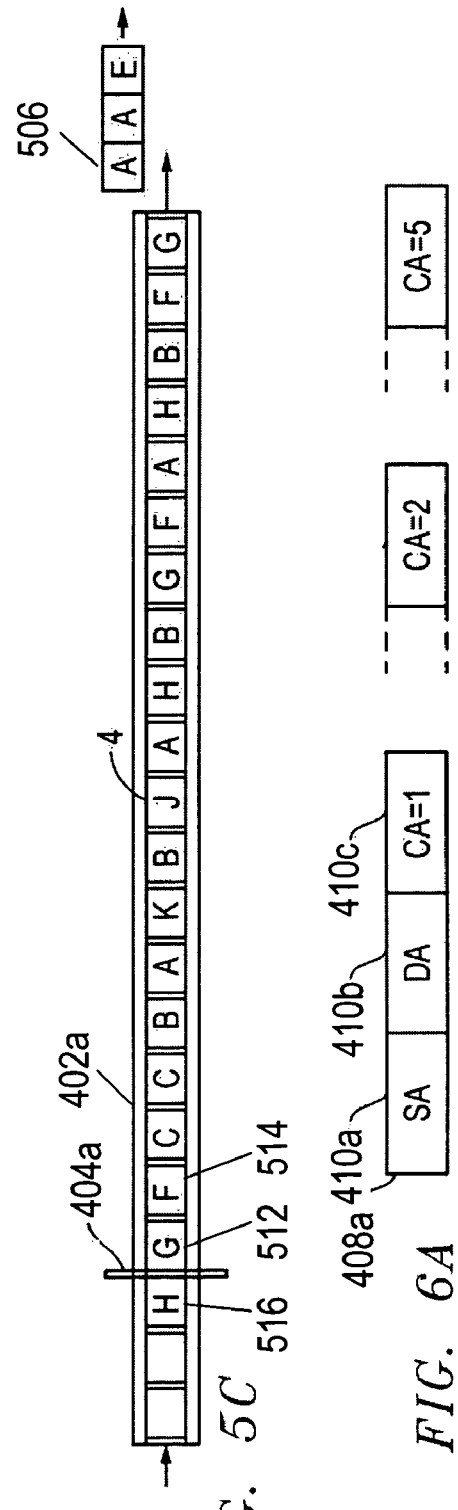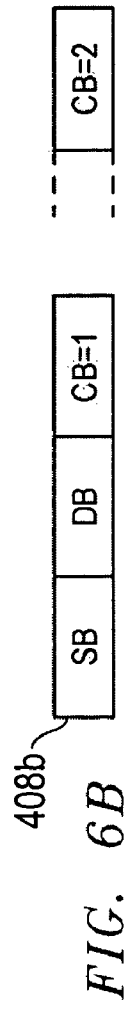

METHOD AND ARRANGEMENT IN A PACKET SWITCH

CROSS-REFERENCE TO RELATED APPLICATIONS

This application claims the benefit of the filing of U.S. provisional patent application No. 60/420,087 filed on Oct. 21, 2002, the disclosure of which is incorporated herein by reference.

TECHNICAL FIELD

The invention relates to control of flow of data through a switching network. More specifically, the invention relates to data-traffic regulation in a packet switching node for avoiding congestion.

BACKGROUND

One principle for electronically conveying and directing data from a sending entity to a receiving entity through a switching network is known as packet switching. Data is aggregated into packets, which carry data and overhead. The overhead comprises e.g. addressing information used by the switching network for conveying the packet from the sending entity to the receiving entity.

A packet switching network has nodes interconnected by transmission links. A node may in turn comprise one or more switch elements interconnected by internal transmission links. There exist different internal structures of switch elements as well as of networks. Such structures are known as e.g. fabrics and topologies, respectively.

A typical node has several switch elements, each having e.g. a crossbar switch fabric. The switch elements are interconnected by transmission links forming an internal network within the node. Packets traversing through the node from an input to an output follow a predetermined route called a path.

For many types of fabrics or topologies, there are relatively scarce resources in a switch element or a network, which have a number of inputs and outputs, called ports. Certain transmission links are shared by several users and may become congested with data. To assure a reasonable data throughput, buffers are arranged in ingress parts at the inputs of the switch elements.

Although efficient, congestion and loss of data may occur due to limitations in the number of viable buffers. One scheme for overcoming such problems is to employ flow control.

Each ingress part of the switch element has a number of the buffers arranged as a number of logical queues, referred to as "virtual output queues". The virtual queue concept solves a problem known as Head-Of-Line Blocking, where packets destined for one congested egress part of the switch fabric are blocking later packets destined for another egress part of the switch fabric.

Each virtual queue has a threshold detector to indicate an emerging congestion condition. At a certain queue threshold level, it is likely that arriving packets will overflow the virtual queue. In order to prevent overflow, a flow control mechanism halts packets at the source, which is known as "flow turn-off."

When a congestion condition ceases, halted packets are be released from the source, which is known as "flow turn-on." Flow turn-on can be accomplished through a timer located at the source. After a certain time interval, it is assumed that the congestion condition has ceased. The timer resets the halt state of the source, and transmission is thus resumed. This solution, however, may result in inefficient usage of switching resources and poor overall performance of the node.

Another approach for achieving flow turn-on is to monitor congestion in the switch elements, and send a release signal (e.g. "XON") to sources having halted packets when the congestion condition ceases. Halt states may be stored within the switch elements. Each state is associated with a certain path relating to halted packets. The switch element thus remembers paths for which halt signals have been sent. The state is used for creating a release signal corresponding to a previously sent halt signal when the congestion condition ceases. After the release signal is sent, the state is purged and is ready for reuse. In a network, however, there are a large number of paths and it is difficult to manage all the paths due to physical and/or cost constraints. What is needed, therefore, is an efficient and cost effective system and method to manage congestion in switch elements.

BRIEF SUMMARY

A system and method are disclosed for switching a data flow of information packets intended for paths between a respective sending and receiving entity, the method includes buffering the packets from the paths in a queue; halting a sending entity on congestion of the queue; storing the halt condition in a switch state; noting the individual portions that different of the paths occupy in the queue; halting the sending entity for the path occupying the individually greatest portion of the queue; storing an indication of the halted path in a free one of the switch; successively updating an indication of the respective bandwidth of halted paths as the queue is repeatedly congested; determining an older part of the states; and purging the state for a path having the smallest bandwidth in said older part of the states.

BRIEF DESCRIPTION OF THE SEVERAL VIEWS OF THE DRAWINGS

FIGS. 5*a*, 5*b*, and 5*c* show block diagrams of a virtual queue implemented by one aspect of the present invention;

FIGS. 6*a* and 6*b* show block schematics of states implemented by one aspect of the present invention;

DETAILED DESCRIPTION

Figure 1:
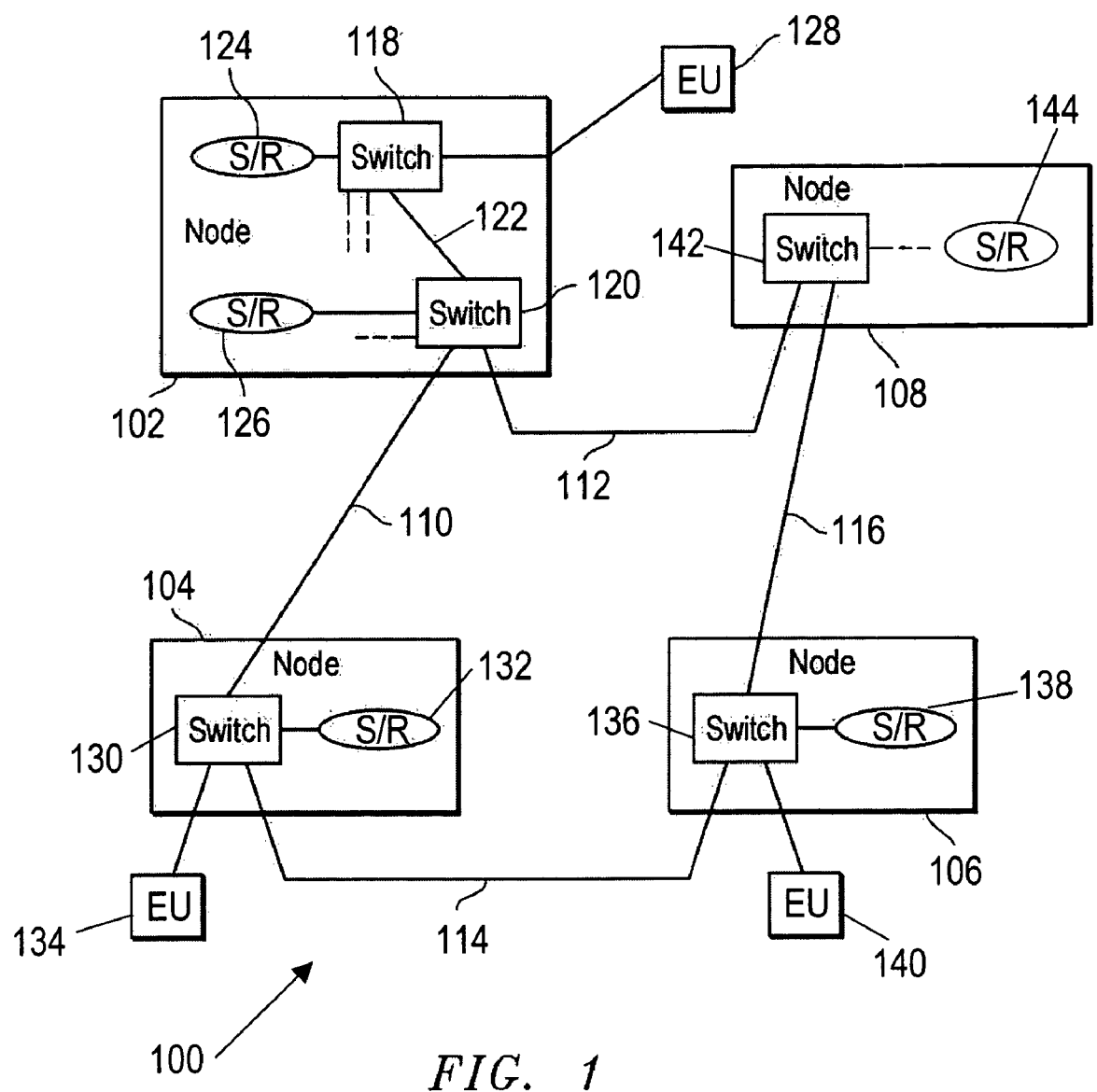
FIG. 1 shows a block schematic of an exemplary network incorporating one aspect of the present invention.

For the purposes of promoting an understanding of the principles of the present inventions, reference will now be made to the disclosed embodiments, or examples, illustrated in the drawings and specific language will be used to describe the same. It will nevertheless be understood that no limitation of the scope of the invention is thereby intended. Any alterations and further modifications in the described embodiments, and any further applications of the principles of the inventions as described herein are contemplated as would normally occur to one skilled in the art to which the invention relates.

As is known in the art, a packet switching network has nodes interconnected by transmission links. A node may in turn comprise one or more switch elements interconnected by internal transmission links. There exist different internal structures of switch elements as well as of networks. Such structures are known as e.g. fabrics and topologies, respectively. This definition is used herein.

An exemplary packet switching network 100 incorporating one aspect of the present invention is shown in FIG. 1. The network includes a plurality of nodes, for example nodes 102, 104, 106 and 108, which are interconnected by links 110, 112, 114 and 116. The nodes may have a plurality of switches and other components. For instance, the node 102 may have a plurality of switches (switches 118 and 120 are shown interconnected by a link 122). The switches 118 and 120 may also be connected to sending/receiving entities 124 and 126 respectively. Additionally, the switch 118 may be connected to an end user 128. The node 102 may have additional elements which are discussed below in reference to FIG. 2.

In the illustrative example, the node 104 is connected to the node 102. The node 104 comprises a switch 130 which may be connected to the switch 120 via the link 110. The switch 130 may also be connected to a sending/receiving entity 132 and an end user 134. The node 106 is connected to the node 104. The node 106 comprises a switch 136 which may be connected to the switch 130 via the link 114. The switch 136 may also be connected to a sending/receiving entity 138 and an end user 140. Similarly, the node 108 comprises a switch 142 which may be connected to the switch 136 via the link 116 and the switch 120 via the link 112. The switch 136 may also be connected to a sending/receiving entity 144 and other nodes of networks which are not illustrated in FIG. 1.

For the sake of simplicity, an exemplary aspect of the present invention is described in the context of the node 102 within a packet switching network of FIG. 1. Although it is assumed herein that the aspect is applied in a node and that paths have node boundaries, it should not be regarded as limiting the scope of the invention. A node and paths may have a broader definition than those described in the present aspect without departing from the spirit of the invention.

A typical node may have several switch elements and each switch element may have a switch fabric (e.g. a crossbar switch fabric). A crossbar switch fabric is a matrix of rows and columns that constitute inputs and outputs, respectively. The rows and columns are interconnected as needed by controlling active elements in the cross-points of the matrix of the switch fabric. The switch elements are interconnected by transmission links forming an internal network within the node. Packets traversing through the internal network of the node from an input of the node to an output of the node follow a predetermined route through the internal network. The route is called a path, and all packets following the same path are said to belong to the path. The path starts with the source (or generator), and ends with the destination (or sink).

For many types of fabrics or topologies, there are relatively scarce resources in a switch element or a network. A switch element or a network has a number of inputs and outputs, called ports. Certain transmission links are shared such that data between different inputs and outputs is traversed over one and the same transmission link. These may become congested with data and are thus scarce.

Figure 2:
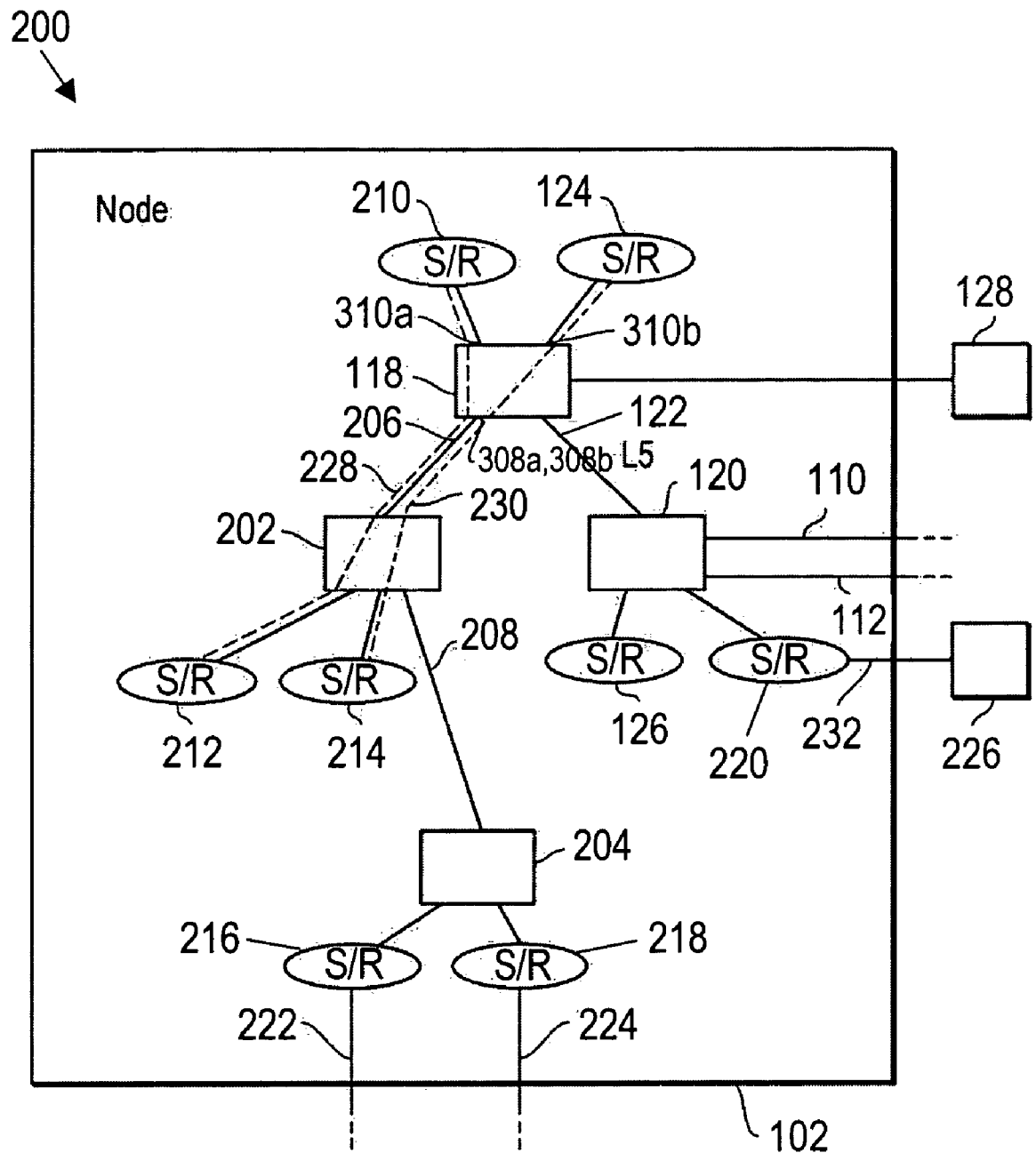
FIG. 2 shows a block schematic of an exemplary node incorporating one aspect of the present invention.

FIG. 2 schematically depicts an exemplary embodiment of the node 102 which includes the two interconnected switch elements 118 and 120 discussed previously. In this embodiment, the node 102 also includes switch elements 202 and 204. The switch element 202 may be connected to the switch element 118 by link 206. Similarly, the switch element 204 may be connected to the switch element 202 by link 208. The switch 118 may be connected to a sending/receiving unit 210 and the switch 202 is connected to sending/receiving units 212 and 214. As illustrated in FIG. 2, the switch 204 may be connected to sending/receiving units 216 and 218. The switch 120 may be connected to the switch 126 and a switch 220. The switch 220 may be connected to an end user 226. Similarly, the switch unit 118 may be connected to an end user 128. The switch elements and the interconnection links constitute a node-internal network 200.

The sending/receiving units (e.g. 216 and 218) may be linked to other nodes or networks, as hinted by links 222 and 224. Other sending/receiving units may also be connected to end user terminals, such as terminal 226 which is connected by a link 232. A route between a source and a destination is called a path, such as a path 228 between the sending/receiving entities 212 and 210, marked by a dashed line. Another route between the sending/receiving entities 214 and 124 is marked as a path 230 with a dash dotted line. As illustrated, the routes have a common path between the switches 202 and 118.

Figure 3:
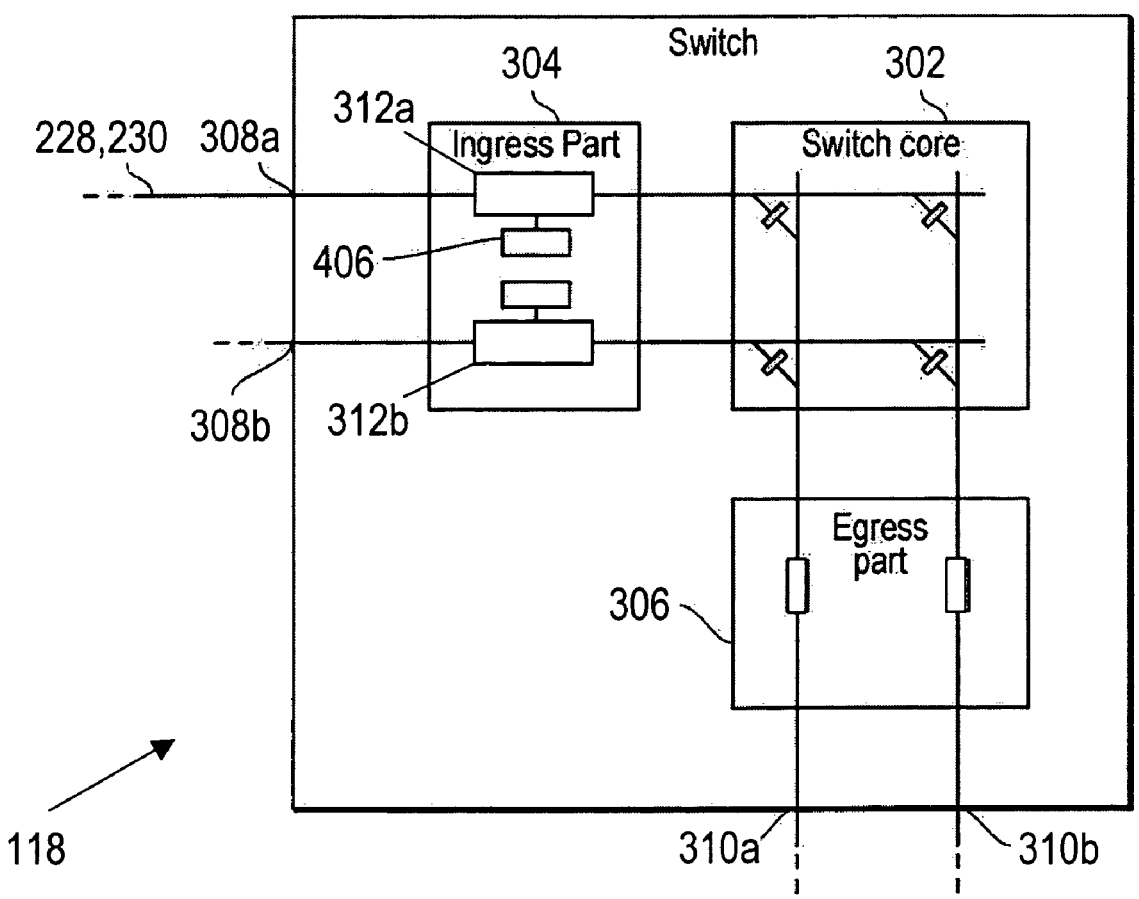
FIG. 3 shows a block schematic of an exemplary switch element of a cross-bar type implementing one aspect of the present invention, having virtual output queues in ingress parts of switch ports of the switch elements.

FIG. 3 shows an example the switch element 118 in more detail. The switch element 118 may have a switch core 302 connected to an ingress part 304 and an egress part 306. The ingress part 304 may be connected to ingress ports 308a and 308b and the egress part 306 may be connected to egress ports 310a and 310b.

In the illustrative example, data may be transmitted along the paths 228 and 230 (see FIG. 2), and other paths not shown, to the ingress port 308a on the switch 118. As previously discussed, an excessive amount of data transmission can cause congestion in the switch 118. To alleviate some of the congestion in order to allow a reasonable data throughput through the switch elements and networks, a plurality of buffers 312a, 312b may be used for each port. Buffers may, for example, be arranged in the ports at the inputs of the switch elements. Although the use of buffers are somewhat effective, congestion and possibly loss of data may still occur due to limitations in the number of viable buffers. One scheme for overcoming such problems is to employ flow control mechanisms.

As illustrated, the ingress part 304 of the switch 118 may use a number of buffers. The buffers 312a and 312b of each respective ingress part may be arranged as a number of logical queues (not individually shown in FIG. 3). The buffer section of an ingress part is considered a shared resource. The buffers are dynamically assigned to the different queues on demand. The queues are referred to as "virtual output queues" since each queue is assigned packets relating to a particular output of the switch fabric.

Figure 4:
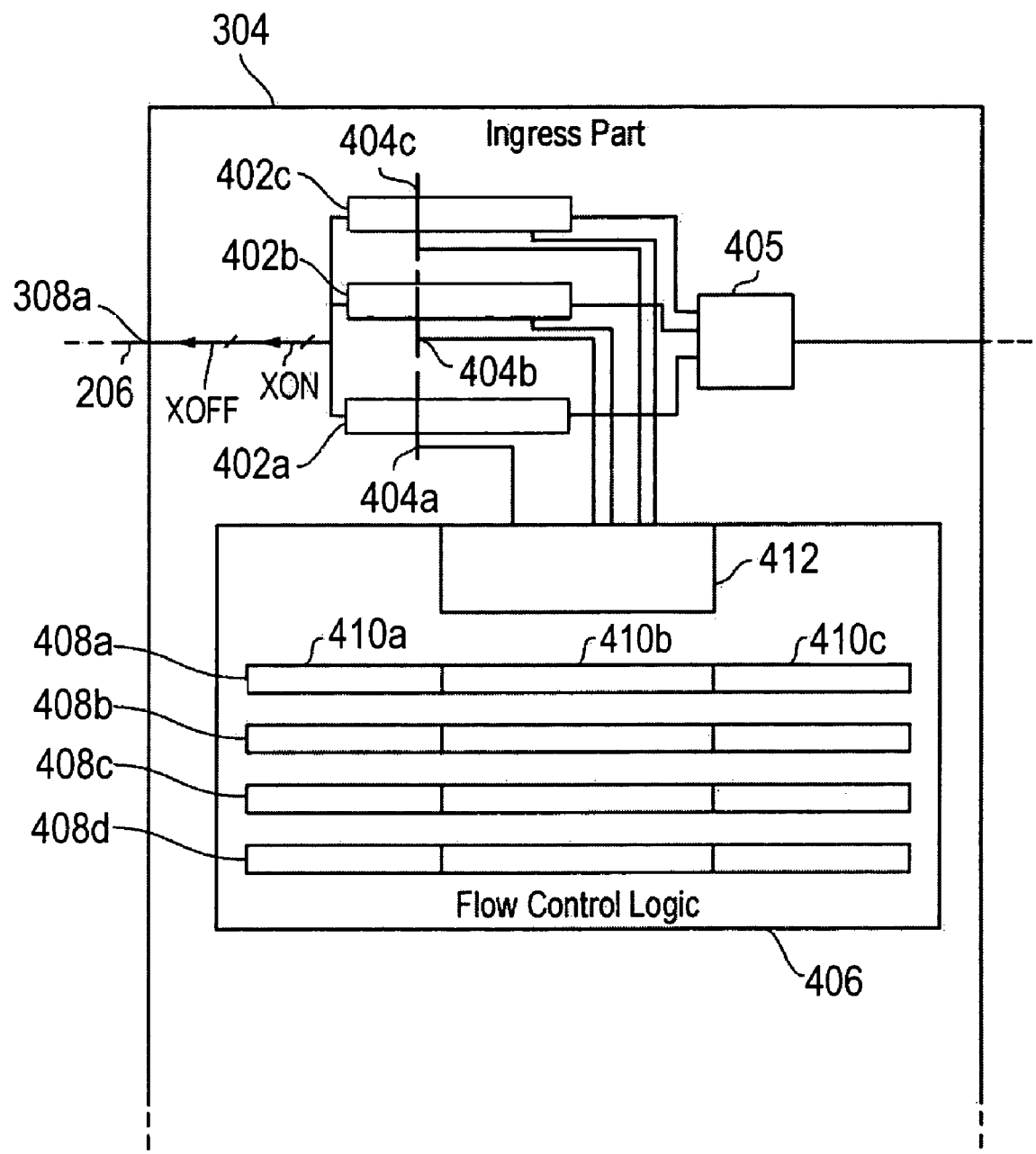
FIG. 4 shows block schematic of an exemplary switch ingress unit with the virtual queues implementing one aspect of the present invention, a threshold detector and a flow control device comprising states, each of which has a counter for counting congestion detection.

FIG. 4 further shows the ingress part 304 having virtual output queues 402a, 402b and 402c connected to the ingress port 308a which is a part of the link 206 (FIG. 2). Threshold detectors 404a, 404b and 404c monitor the queues and a selection function 405 is coupled to the queues and directs packets from the queues to the switch fabric 302 (FIG. 3). The threshold detectors 404a-404c are coupled to a flow control logic unit 406 comprising a plurality of states (e.g., states 408a, 408b, 408c and 408d). Each state has a register with a part or portion 410a for a source address, a part 410b for a destination address and a part 410c for a counter value. The flow control logic unit 406 also includes a control unit 412 for reading the queues and controlling the states.

The virtual queue concept solves a problem known as Head-Of-Line Blocking, where packets destined for one congested egress part of the switch fabric are blocking later packets destined for another egress part of the switch fabric. Each threshold detector 404a-404c monitors its respective queue 402a-402c to indicate an emerging congestion condition. At a certain queue threshold level, it is likely that arriving packets will eventually overflow the queue, the size of which is limited by the availability of buffers belonging to the ingress part.

In order to prevent overflow, a flow control mechanism may halt packets at the source, e.g. packets may be halted by the sending/receiving entity 212 (FIG. 2). Paths contributing accounting for the majority of the queue length of a virtual queue may be identified, and a halt signal (XOFF) may be sent to the source of the signals for that path. In response to the halt signals, the source may then halt the transmission of packets. As previously discussed, this process is called flow turn-off.

As packets are received at the ingress parts of a switching node, they may be placed in their respective virtual queues 402a to 402b by their egress part destinations. In the event that the threshold detector 404a-404c of the virtual queue 402a-402c is triggered when a packet is placed in the queue, the path information of each state is checked for a match with the path having the highest representation in the virtual queue, i.e. having the highest byte count.

A match results in the increment-by-one of a counter value stored in the state for which the match occurred. The counter value may be an indication of the bandwidth of the related path. Provided there are free states and there is no match, the path information is stored in a free state and a halt signal (e.g., "XOFF") is sent to the source. Measures may be taken so that a chronological order between states is established with respect to times of seizure of the states, i.e. a point in time when paths were stored in the states. The state may be linked in a linked list to the other states.

An illustrative example will be used to further explain the above procedure. Turning now to FIG. 5a, there is shown the virtual queue 402a with its content of data packets 502. In this example, packets marked with an "A" (i.e., "A" packets) indicate that they were sent from the sending/receiving entity 212, packets marked with a "B" ("B" packets") indicate that they were sent from the sending/receiving entity 214 and packets marked with the letters "C" to "K" were sent from other sending entities not specifically identified, where each letter indicates a separate source.

FIG. 5b illustrates the virtual queue 402a, but at a different point in time. Similarly, FIG. 5c illustrates the virtual queue 402a, but at another point in time.

Turning back to FIG. 5a, there it is illustrated that the queue 402a is near a congested state because the content (indicated by the packets having letters) has reached the threshold 404a with one of the "B" packets. Assume a "C" packet 508 now arrives in the queue, which will then trigger the threshold 404a. In this example, there are five "A" packets, four "B" packets, one "C" packet, one "D" packet, etc. Assuming that all packets are the same size, the "A" packets occupy the largest amount of memory in the queue. Because the "A" packets originate from the sending/receiving entity 212, a halt signal (e.g, "XOFF") may be sent to the corresponding source address SA for the sending/receiving entity 212. In response, the sending/receiving entity 212 will stop sending the packets.

FIG. 6 illustrates the states 408a and 408b illustrating a stored content after congestion has begun to occur. In this example, it will be assumed that the sending/receiving entity 212 has the source address "SA," the "A" packets have a destination address of "DA" and the counter value is "CA." Similarly, it will be assumed that the state 408b for the sending/receiving entity 214 has the values SB, DB and CB. Thus, to indicate the halted path 228, the source address SA and the destination address DA may be stored in the state 408a. The counter value is set to CA=1. In this example, it is also assumed that the state 408b has been set earlier for the packets B of the path 112 from the sending/receiving entity 214 with a counter value CB=1.

Turning now to FIG. 5b, where the contents of virtual queue 402a is illustrated for slightly later position in time than shown in FIG. 5a. In FIG. 5b, it is assumed that the switch core 302 has executed a "D" packet 504 which was first in the queue. Once the packet 504 has been executed, the queue length drops below the threshold 404a. So, a release signal XON may be sent for all the states (e.g., states 408a and 408b) which track the queue 402a.

For the sake of illustration, assume that a new "C" packet 510 arrives to the queue 402a, which will trigger the threshold 404a once again. When the threshold 404a has been triggered, the different sets of packets A-K are analyzed by the control unit 412. In this example, once again the "A" packets occupy the individually greatest part of the queue. So, a halt message is once again sent to the address "SA." Thus, the counter in the state 408a is thus set to CA=2.

FIG. 5c illustrates a later point in time than FIG. 5b where it is assumed that a group of packets 506 (containing "E," "A" and "A" packets) are executed successively by the switch core 302. It is also assumed that new packets 512 and 514 (which are "G" and "F" packets) arrive and causes that the threshold 404a to again be triggered each time one of the packets arrive. Each time the threshold 404a is triggered, an analysis is performed to determine which packets occupy the largest amount of the queue 402a. Thus, in this example, the "A" packets still occupy the largest amount of the queue. So, halt messages are sent to the address "SA" each time the threshold is triggered (e.g., three times). At the end of the process, the counter "CA" would be increased to the value CA=5.

Further assume that a "H" packet 516 arrives which causes that the threshold 404a to again be triggered. Another analysis is performed where the packets for the different paths are counted. It is now determined that the path 230 (FIG. 2) with the four packets B that occupies the largest portion of the queue 402a. As discussed previously, it has already been assumed that the state 408b tracks the path 230. So the counter for state 408b would be set to CB=2.

In the above example, the number of data packets (e.g., "A", "B", "C", etc.) from the different paths are counted to determine which path that occupies the greatest part of the queue. This procedure is only for the sake of simplification. An alternative method would count the total length in the queue that a certain path occupies (e.g. counted as the total number of bytes). The age of a state can be noted in different ways, e.g. by a time stamp or by arranging the states in a time loop. It should also be noted that in a real situation the flow control block 406 normally has many more states than shown in FIG. 4 and that the virtual queues 402a, 402b and 402c have many more data packets than shown.

The different states (e.g., 408a to 408d) may be taken into use successively and the control unit 412 tracks when each state was initiated. Obviously, the number of states is finite. So, after some period of time they all will be occupied. Thus, if congestion occurs and there are no free states, a state must be purged, (e.g. be made ready for reuse). One manner in which a state is chosen for purging will now be further explained.

In one aspect of the invention, the states may be divided into two parts, an older part and a newer part or, in the present example, an older half and a newer half. The older-half of the states might include 408a and 408b. Thus, states 408a and 408b may be evaluated with respect to their bandwidth indicators, which in the illustrated embodiment would be the counter values (e.g., CA and CB). The state having the lowest counter value may be purged. Should two or more states have one and the same lowest counter value, then the oldest state may be purged. When a state is purged, a release signal XON is sent to the source related to the state. Thus, in the example above, a "XON" signal may be sent to the entity 214 sending the packets B.

After the state has been purged, it is ready for reuse, and the path of the packet placed in the virtual queue is stored in the purged state in the same manner as described above.

Figure 7:
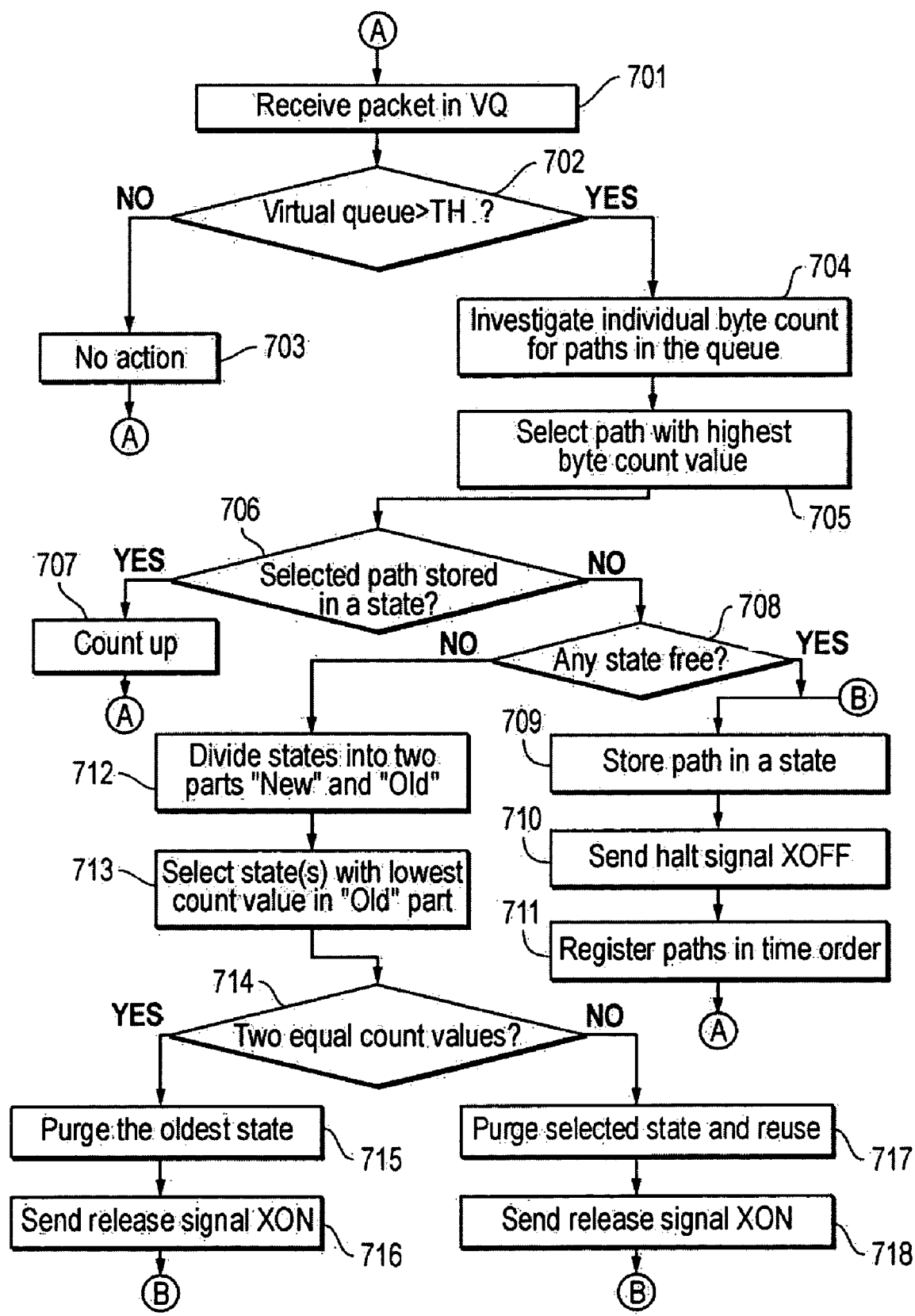
FIG. 7 shows a flow chart illustrating one aspect of the present invention.

FIG. 7 shows a flow chart which graphically describes one aspect of the method that is described above in connection with the FIGS. 4, 5 and 6. The method starts at point "A" when the ingress part 304 of the switch 118 receives a data packet (step 701). In a step 702, an investigation is made to determine whether the virtual queue 402a has reached the threshold 404a (FIG. 4). If no, then no action is taken and, according to a step 703 the process returns to point "A." On the other hand, if the virtual queue 402a has reached the threshold 404a (e.g., the queue is congested, the process flows to step 704. In step 704, the different portions in bytes that the different paths (illustrated by A, B, C, etc.) occupy of the virtual queue 402a may be analyzed.

In a step 705, the one of the paths that occupies the largest portion of the virtual queue 402a may be selected. In a next step 706, an investigation is made to determine whether the selected path is already stored in one of the states (e.g. 408a-408d). If yes, then the counter value for the path is counted up one value (step 707) and the process returns to point "A" where a new data packet can be received. On the other hand, if the selected path is not stored in one of the states, the process proceeds to step 708. In step 708, an investigation is performed to determine if any of the states (e.g., 408a-408d) are free. If yes, then the process flows to step 709 where the selected path is stored in a free state. A halt signal (e.g., "XOFF") may now be sent to the source address for the selected path (step 710). In step 711, this path is then registered in time order with the other halted paths. So, new data packets can be received and the process returns to point "A."

Turning back to step 708, if no state was found to be free, one of the earlier occupied states may be purged and be reused. In this illustrative embodiment, this is performed such that in a step 712 the states are divided into two parts, an old part and a new part. In a step 713, the old part of the states is examined and the state or states with the smallest bandwidth are selected. The bandwidth may be measured as the counter value CA, CB, . . . etc. In a step 714, a determination is made whether two paths have the same bandwidth. If yes, then for this example, the oldest one of the states is purged in a step 715 and in a step 716 the release signal XON may be sent to the source for the path in the purged state. The process returns to point "B" where this state may then be reused in accordance with the steps 709, 710 and 711. On the other hand, if in the step 714, the states do not have equal bandwidth measurement values, the process proceeds to step 717. In step 717, the selected state is purged and made available for reuse. In step 718, a release signal (e.g. "XON") may be sent and the process flows to point "B" where the purged state is then reused in accordance with the steps 709, 710 and 711.

Figure 8:
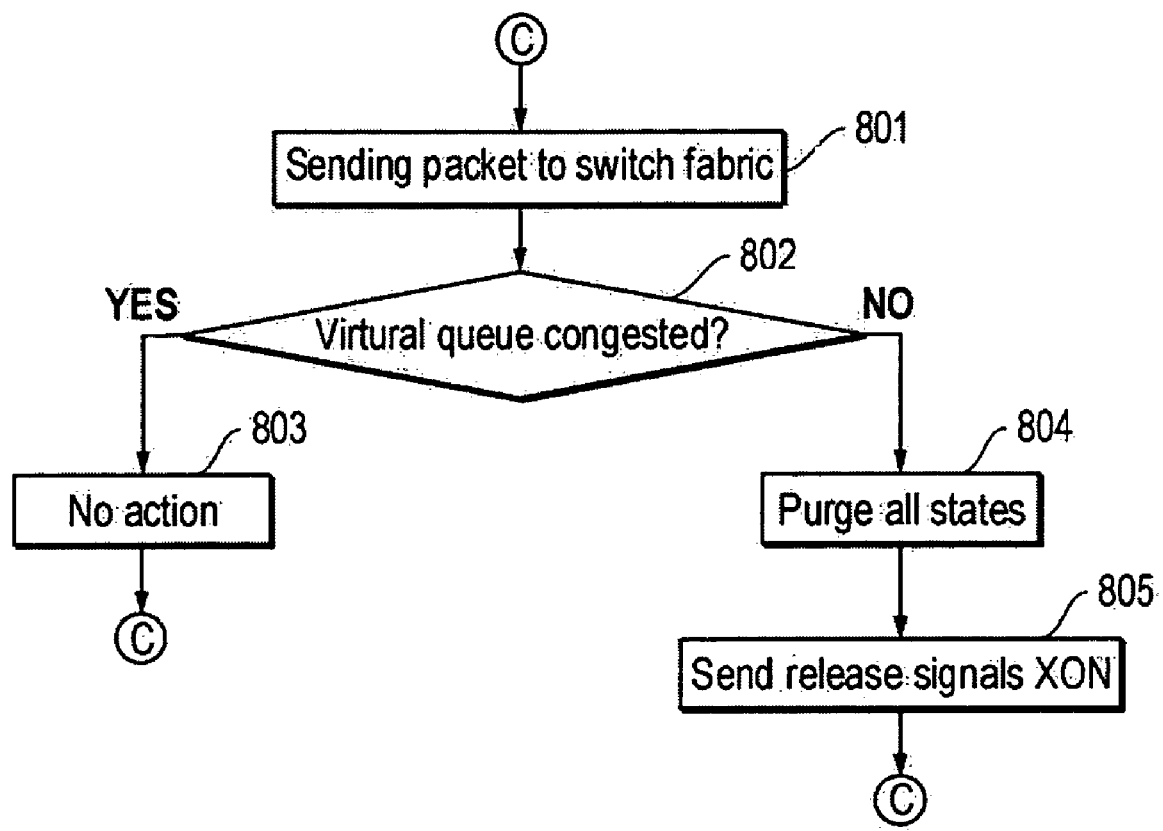
FIG. 8 shows a flow chart which is a continuation of the method illustrated in FIG. 7.

Turning now to FIG. 8, there is illustrated a method describing what happens when the data packets in the virtual queue 402a are executed in the switch core 302. In a step 801, a data packet is sent to the switch core. A determination is made in step 802 whether the virtual queue 402a is still congested. If yes, then no action is taken (step 803) and the process returns to point "C". If no, then all states related to the virtual queue 402a are purged according to a step 804. In a step 805, a release signal (e.g., "XON") may be sent to all the sources sending data packets via the virtual queue 402a and the process returns to point "C".

As another example, one aspect of the present invention may be express in pseudo-code. In psuedo-code, an algorithm for carrying out the method might be as follows:

```
Each time a packet is received at an ingress part:
{
IF (virtual queue > threshold) THEN
    IF (path of packets having highest byte count in virtual queue is already stored in
state) THEN
        increase bandwidth indicator in the state
    ELSEIF (all states are used) THEN
        select the older half of the states
        IF (more than one state has the same value in the bandwidth
            indicator of the selected old states) THEN
        send a release signal (XON) to the source with the oldest
            state and purge the state
    send a halt signal (XOFF) to the source of packets having highest byte count in
virtual queue
}
Each time a packet is sent from the ingress part into the switch fabric:
IF (virtual output queue < threshold) then
    send a release signal for all states related to the virtual queue
```

Although only a few exemplary embodiments of this invention have been described in detail above, those skilled in the art will readily appreciate that many modifications are possible in the exemplary embodiments. Accordingly, all such modifications are intended to be included in the scope of this invention as defined in the following claims. In the claims, means-plus-function clauses are intended to cover the structures described herein as performing the recited function and not only structural equivalents, but also equivalent structures.

The invention claimed is:

1. A method of switching a data flow of information packets between a sending and receiving entity, the method comprising:
   buffering in a queue, the packets received from a plurality of paths;
   determining from a congestion indicator that a congestion condition exists in the queue;
   determining a number of packets received from each of the plurality of paths;
   sending a halt message to a sending entity corresponding to a given path from which the greatest number of packets was received in the queue;
   determining if there is a free switch state associated with the queue, wherein the free switch state indicates a path is not halted, and a set switch state indicates a path is halted,
   if yes, then:
      storing an indicator of the halted given path in the free switch state including storing an indicator of the bandwidth associated with the halted path;
   if no, then:
      establishing a chronological order in which the set states were set;
      determining an older portion of the set states; and
      purging the set state in said older portion of the set states corresponding to a halted path that has been halted the fewest number of times, and
   successively updating the congestion indicator when the queue reaches a subsequent congestion condition.

2. The method of claim 1 further comprising reusing the purged state.

3. The method of claim 1 further comprising determining the queue congestion by a threshold.

4. The method of claim 1 wherein the state includes a counter field, and the path bandwidth is noted in said counter field as the number of times the respective path has been found to have provided the greatest number of packets in the queue.

5. A device for switching a data flow of information packets intended for paths between a respective sending and receiving entity, the device comprising:
   a queue device for buffering the packets received from the paths in a queue;
   a device for halting a sending entity upon detecting congestion of the queue, wherein the device for halting has means for halting the sending entity for the path from which the greatest number of packets was received in the queue;
   switch states for storing a halt condition whenever a corresponding path is halted, wherein each set switch state stores a respective indicator for indicating a number of times the state's corresponding halted path has been halted;
   means for determining a number of packets received in the queue from each of the plurality of paths;
   means for successively updating in each set state, the respective indicator for indicating the number of times the state's corresponding halted path has been halted, as the queue is repeatedly congested;
   means for establishing a chronological order in which the set states were set;
   means for determining an older portion of the set states; and
   means for purging from the older portion of the set states, a set state corresponding to a halted path that has been halted the fewest number of times.

6. The device of claim 5 wherein the purged state is reused.

7. The device of claim 5 further comprising a threshold detector for determining the congestion of the queue.

8. The device of claim 5 wherein the state includes a counter field, and the device includes means for noting the path bandwidth in said counter field as the number of times the respective path has been found to have provided the greatest number of packets in the queue.

* * * * *